United States Patent [19]

Van Hecke

[11] 4,035,166
[45] July 12, 1977

[54] REGENERATION OF REGENERABLE AQUEOUS SCRUBBING SOLUTIONS USED FOR REMOVING ACIDIC GASES FROM GAS MIXTURES

[76] Inventor: Francis Van Hecke, 183, avenue de Tervueren, B-1040 Brussels, Belgium

[21] Appl. No.: 644,011

[22] Filed: Dec. 24, 1975

[30] Foreign Application Priority Data

Dec. 24, 1974 United Kingdom ............. 55871/74

[51] Int. Cl.² ........................................ B01D 47/00
[52] U.S. Cl. ..................... 55/38; 55/48; 55/73; 423/243
[58] Field of Search .............. 55/38, 40, 43, 44, 46, 55/48, 51, 68, 73, 84; 423/235, 236, 243

[56] References Cited

U.S. PATENT DOCUMENTS

| | | | |
|---|---|---|---|
| 2,868,327 | 1/1959 | Rotzler et al. ...................... | 55/46 X |
| 2,886,405 | 5/1959 | Benson et al. ...................... | 423/235 |
| 3,217,466 | 11/1965 | Bogart ................................ | 55/48 X |
| 3,236,030 | 2/1966 | Tress ................................... | 55/48 X |
| 3,553,936 | 1/1971 | Little et al. ......................... | 55/73 X |
| 3,563,695 | 2/1971 | Benson ............................... | 423/235 |
| 3,563,696 | 2/1971 | Benson ............................... | 423/235 |
| 3,773,895 | 11/1973 | Thirkell .............................. | 423/232 X |
| 3,823,222 | 7/1974 | Benson .............................. | 423/232 X |

FOREIGN PATENT DOCUMENTS

2,057,503   5/1971   France ................................. 55/48

Primary Examiner—Thomas G. Wyse
Assistant Examiner—Robert H. Spitzer
Attorney, Agent, or Firm—Sughrue, Rothwell, Mion, Zinn and Macpeak

[57] ABSTRACT

This invention relates to a process for the regeneration of regenerable aqueous scrubbing solutions which are used for the bulk removal of acidic gases, by absorption from gas mixtures containing these acidic gases, in a cyclic process in which said aqueous scrubbing solutions are regenerated in a regeneration system by steam stripping before being recycled to the absorption stage, a part of the scrubbing solutions being regenerated in a main regeneration section of the regeneration system, whereas the other part of the scrubbing solutions is regenerated in an auxiliary regeneration section of the regeneration system.

According to the invention, the pressure in the auxiliary regeneration section is selected independently from the pressure in the main regeneration section and at least a part of the stripping steam required in the auxiliary regeneration section is obtained through flashing of the scrubbing solution in a reduced pressure zone connected to the suction side of a steam-jet thermocompressor, the mixture of thermocompressor motive steam and recompressed flashed vapor being directly discharged into said auxiliary regeneration section.

17 Claims, 4 Drawing Figures

REGENERATION OF REGENERABLE AQUEOUS SCRUBBING SOLUTIONS USED FOR REMOVING ACIDIC GASES FROM GAS MIXTURES

PRIOR ART

Processes for the regeneration of regenerable aqueous scrubbing solutions, which are used for the bulk removal of acidic gases, such as $CO_2$, $H_2S$, HCN, COS, $SO_2$ mercaptans, etc., by absorption from gas mixtures containing these acidic gases, in a cyclic process in which said aqueous scrubbing solutions are regenerated by steam stripping before being recycled to the absorption stage, are known.

The invention relates particularly to a process for the regeneration of regenerable aqueous scrubbing solutions which are used for the bulk removal of acidic gases, by absorption from gas mixtures containing these acidic gases, in a cyclic process in which said aqueous scrubbing solutions are regenerated in a regeneration system by steam stripping before being recycled to the absorption stage, a part of the scrubbing solutions being regenerated in a main regeneration section of the regeneration system, whereas the other part of the scrubbing solutions is regenerated in an auxiliary regeneration section of the regeneration system.

The gas mixture which must be purified may be either a natural gas stream or an industrial process gas.

The most commonly used aqueous scrubbing solutions used in a cyclic process are solutions of alkaline carbonates, particularly potassium carbonate which may contain any of the well known activation additives such as arsenites, borates, aminoacids, alkanolamines or other additives which increase the rates of absorption and desorption of the acidic gas in the scrubbing solution. In addition to the alkaline carbonate solution, other regenerable solutions such as aqueous solutions of ethanolamines and other alkanolamines, of alkali metal salts of aminoacids, of alkaline phosphates, alkaline phenates, alkaline borates and other similar components are used either separately or in admixture. For the absorption of $SO_2$ it is sometimes preferred to use a solution of alkali metal sulfites and bisulfites. It is common practice to incorporate in these solutions a corrosion inhibitor.

The regeneration of the spent scrubbing solution by steam stripping and boiling takes place at a regeneration pressure which is usually close to the atmospheric pressure, corresponding to boiling temperatures which are commonly in the range of 70° to 150° C.

The stripping steam may be produced by boiling the aqueous scrubbing solution in an indirectly heated reboiler, or be obtained from an outside steam source supplying live steam. The spent scrubbing solution which leaves the absorber where the absorption of the acidic gas has normally been carried out under a superatmospheric pressure, is first submitted to a pressure reduction and flashing before being introduced in the steam stripping zone of the regeneration section.

The regeneration equipment which is commonly used comprises a regeneration column equipped with packing materials, bubble cap plates, sieve trays or other suitable means for ensuring intimate contact between the solution and the stripping steam. Similar type equipment is used for the absorption stage.

According to the temperature at which the regenerated scrubbing solution is recycled to the absorber and at which the spent scrubbing solution leaves said absorber, the cyclic process may be defined as "isothermal", "optimal" or "classic." In the classic cycle the absorber operates at a moderate temperature which may be close to ambient temperature. As the regeneration by steam stripping takes place at a higher temperature, several heat exchangers and/or solution heaters and coolers will be required in addition to the usual absorption and regeneration equipment. Such a classic cycle is for instance preferred for the removal of $CO_2$, when the scrubbing solution is an aqueous monoethanolamine solution.

When the gaseous mixture which is to be purified is available at such a pressure that the partial pressure of the acidic gas constituent which must be removed is relatively high, it becomes possible to increase the temperature of the absorption stage. The preferred cyclic process will then be either of the isothermal or the optimal type.

The difference between the so-called isothermal cycle and the optimal cycle can most easily be shown in the case of a two stage absorption and regeneration process. In the usual two stage absorption and regeneration cycle, the total flow of spent scrubbing solution is sent to the top of the regenerator, from where a major part of partially regenerated solution is withdrawn at an intermediate level, whereas the remaining minor part of solution is more fully regenerated. Only this minor part of "lean" solution is sent to the top of the absorber, while the major stream of "semi-lean" solution is recycled to the absorber at an intermediate level.

In the so-called isothermal cycle only the minor stream of lean solution is cooled before being introduced at the top of the absorber, whereas the major stream of semi-lean solution is recycled to the absorber without any intermediate cooling whatsoever. In the optimal cycle, the minor stream of lean solution is cooled before recycling to the top of the absorber, in order to adjust the vapour pressure of the solution to a value corresponding to the required degree of purification, whereas the temperature of the semi-lean solution which is recycled to an intermediate level is adjusted by cooling to such a value that the optimal temperature profile for an efficient absorption process can be achieved.

This optimal thermal profile is sometimes important in order to control or limit some unwanted side reactions.

When the optimal cycle is to be applied to a single stage split-flow regeneration system, both the minor flow of regenerated solution which is recycled to the top of the absorber and the major flow of solution which is recycled to an intermediate level of the absorber are cooled although to different degrees. By comparison, in the so-called isothermal single stage split-flow system only the minor flow of regenerated solution is cooled, whereas the major flow of regenerated solution is recycled to an intermediate level of the absorber without cooling.

It is already known that the overall heat requirement of these cyclic processes can be reduced if a dual-pressure regeneration system is used, in which the major part of the spent scrubbing solution is regenerated in a main regeneration column operating at a higher pressure level, while the minor part of the solution is regenerated in a second auxiliary regeneration column operating at a lower pressure level, by a flow of stripping steam which has been produced exclusively by flashing, following pressure let-down, of the major part of regenerated solution from the higher pressure level to the lower pressure level.

According to this above mentioned system essentially all the heat required in order to produce the stripping steam used for pressure both in the higher pressure and in the lower pressures regeneration columns is introduced in the system at the higher pressure level, where the temperature increase of the solution serves as a heat storage from which upon pressure let-down to the lower pressure level, the stripping steam for the lower pressure regeneration column will be obtained.

The thermal efficiency of this above-mentioned dual-pressure regeneration system increases when the pressure difference between the two pressure levels increases. As in general the acidic gases which are desorbed during the regeneration process have to be collected for further treatment, it is usually preferable to operate the lower pressure regeneration column at a pressure which is slightly superatmospheric, so as to decrease the energy requirement for moving the desorbed gas to the next processing stage.

This means that in practice the relative heat saving will be dependent on the increase of pressure, and therefore of temperature, at the column operating at the higher pressure level.

This increase in temperature constitutes sometimes an important drawback in view of some well known undesirable side-reactions such as the thermal degradation of various scrubbing agents, notably the alkanolamines or aminoacids, or the formation of formates, as well as a more important risk of corrosion.

According to a known modification of the above mentioned dual-pressure regeneration process, part of the stripping steam required in the column operating at the lower regeneration pressure can be produced in a solution reboiler operating at said lower regeneration pressure level. If therefore milder operating conditions are desired, it is no longer required that the major part of the solution should be regenerated at the higher pressure level nor is it necessary to increase the pressure in the higher pressure level to the same extent.

However such decreases of the severity of operation can only be obtained at the expense of an increase of the overall heat requirement. This increased heat requirement is introduced in the system through two solution reboilers, one at the higher pressure level and one at the lower pressure level. In this known two-reboiler version of the known dual-pressure regeneration system, the specific problems associated with solution reboilers, i.e. risk of solution overheating and reboiler corrosion are increased in relation to the increased reboiler duty.

BRIEF DESCRIPTION OF THE INVENTION

According to the present invention, it was found that, contrary to all expectations, the severity of operation and the overall heat requirement can be decreased simultaneously together with a reduction of the solution reboiler duty.

The process according to the present invention, in which a part of the aqueous spent scrubbing solution is regenerated in a main regeneration section or column, whereas the other part of said spent scrubbing solution is regenerated in an auxiliary regeneration section or column of the regeneration system, is essentially characterized by the fact that the pressure in the auxiliary regeneration section is selected independently from the pressure in the main regeneration section and at least a part of the stripping steam required in the auxiliary regeneration section is obtained through flashing of the scrubbing solution in a reduced pressure zone connected to the suction side of a steam-jet thermocompressor, the mixture of thermocompressor motive steam and recompressed flashed vapour being directly discharged into said auxiliary regeneration section.

In a particular embodiment of the process according to this invention, the pressure in the auxiliary regeneration section is lower than the pressure in the main regeneration section and a part of the stripping steam required in said auxiliary regeneration section is obtained by direct flashing of the scrubbing solution upon pressure reduction from the higher pressure of the main regeneration section to the lower pressure of the auxiliary regeneration section.

Contrary to the known practice, it was surprisingly found that the pressure in the auxiliary regeneration section may also, according to this invention, be equal to or higher than the pressure in the main regeneration section.

The process according to this invention enables a substantial improvement of the thermal efficiency of the regeneration procedure, due to the fact that only a part of the stripping steam required at the lower regeneration pressure level is obtained through flashing resulting from a pressure let-down of the scrubbing solution from the higher pressure regeneration section to the lower pressure regeneration section, whereas the remainder of said required stripping steam is obtained through additional flashing of the scrubbing solution to a still lower pressure level and recompression of the flashed vapour mixture by way of a steam-jet thermocompressor. This technique avoids all risk of solution overheating in an additional solution reboiler, and recovers under form of useful stripping vapour a certain amount of heat stored in the solution which would otherwise be lost in the coolers which are used to trim the temperature of the solution before recycle to the absorber.

According to an additional feature of the invention, the flashing to the reduced pressure induced by the operation of the steam-jet ejector is performed on a partially or totally regenerated scrubbing solution obtained from either the main regeneration section or the auxiliary regeneration section.

According to still another feature of the invention, a part of the mixture of thermocompressor motive steam and recompressed flashed vapour is discharged in the main regeneration section.

DRAWINGS

Other details and features of the invention will appear from the following detailed description, wherein reference is made to FIGS. 1 to 4 of the attached drawings which represent flow diagrams illustrating, by way of non-limitative examples, four embodiments of the process according to this invention.

DETAILED DESCRIPTION OF THE INVENTION

In the following description, reference is made, by way of example, to a specific operation, i.e. the bulk removal of $CO_2$ from gas mixtures, using, as scrubbing solution, an aqueous concentrated solution of potassium carbonate containing known appropriate additives.

Figure 1:
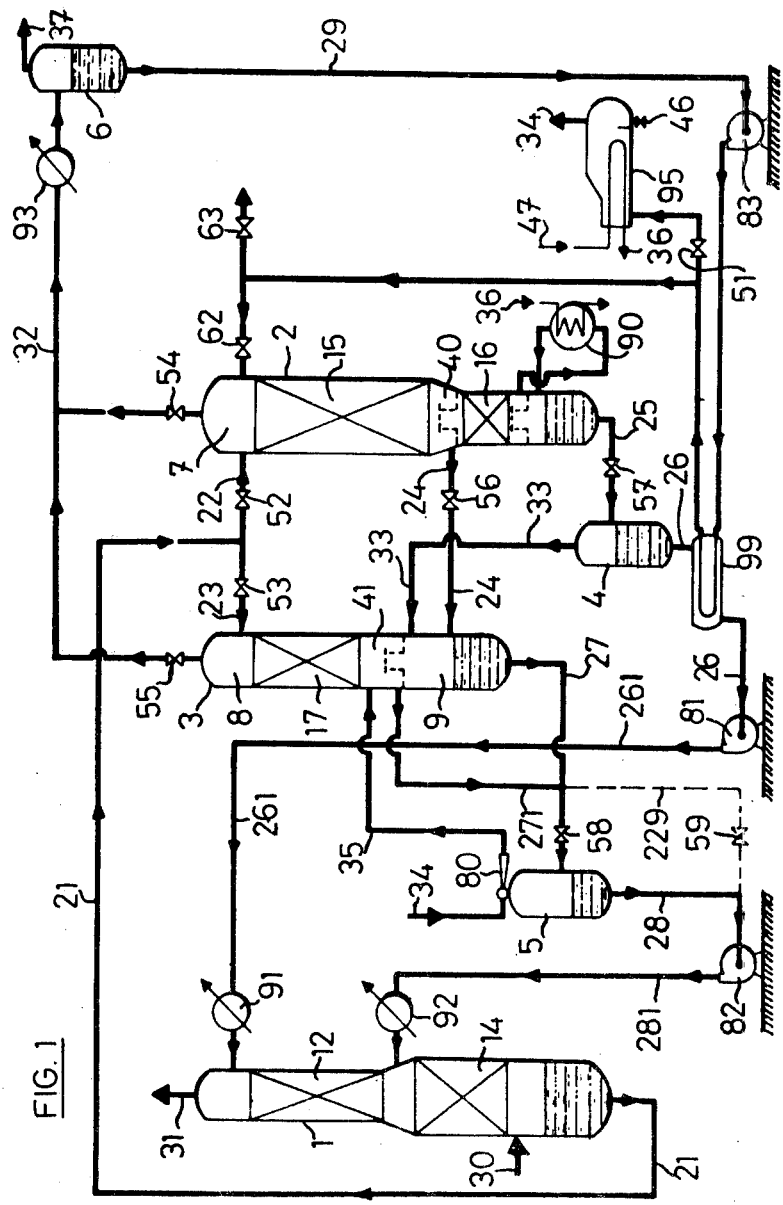

The flow diagram shown in FIG. 1 refers to an optimal cycle of regeneration of the spent scrubbing solution, which due to its possibility of selective temperature adjustment of both the lean and the semi-lean scrubbing solution streams allows enough flexibility to achieve the desired temperature profile in the absorber.

It is thus possible to maintain constant the spent solution outlet conditions in the absorption stage even when modifications in the regeneration section tend to modify the temperature of the semi-lean and lean scrubbing solution streams which are to be recycled.

The process gas which has to be purified is introduced by line 30 at the base of the absorber 1 and leaves the top of said absorber by line 31 after acidic gas removal.

The hot spent scrubbing solution leaving the bottom of absorber 1 through line 21 is sent partly to a main regeneration column 2 through a pressure let-down valve 52 and line 22 and partly to an auxiliary regeneration column 3 through a pressure let-down valve 53 and a line 23.

In the flash zone 7 of the main regeneration column 2 which operates at the higher pressure level, a certain amount of steam and acidic gas is given off, while the remaining solution, which has been cooled by flashing to its boiling temperature under the prevailing pressure, flows downward towards the stripping zone 15.

In this stripping zone the solution flows counter-currently to the stripping steam and is progressively heated by said stripping steam, thereby maintaining the solution at its boiling temperature as it progressively regenerates.

Part of the solution is withdrawn at an intermediate level from draw-off pan 40 after having been partially regenerated, whilst the remainder of the solution flows down through the stripping section 16 to the base of the main column 2 where it is heated in the solution reboiler 90.

The fully regenerated lean solution leaving the base of the regeneration column 2 by line 25 flows through the pressure reducing valve 57 to the expansion vessel 4 which is maintained at the same pressure as the base of the auxiliary regeneration column 3. The flashed gas mixture liberated in 4 flows to the lower part of column 3 where it is used as stripping steam, whereas the lean solution, which has been cooled by flashing, leaves vessel 4 by line 26 and flows to exchanger 99 where it preheats the regeneration condensate before being pumped by pump 81 to the top of the absorber 1 after temperature adjustment in cooler 91.

The partially regenerated semi-lean solution which is withdrawn from draw-off pan 40 flows through the pressure reducing valve 56 and line 24 to the flash zone 9 at the base of the auxiliary column 3.

The gas mixture which is generated by flashing, mixes with the vapour coming from expansion vessel 4 and flows upwards in column 3 where it is used as stripping steam.

At the top of said auxiliary column 3, the solution which has been fed through a pressure let-down valve 53 flows through a flash zone 8 towards a regeneration section 17 where it is regenerated by the flow of stripping steam which rises from the base of the column.

After regeneration, the solution which collects in a draw-off pan 41 is withdrawn through a line 271 and mixes with solution from the flash zone 9 which flows through a line 27. These combined streams flow through a pressure reducing valve 58 to an expansion vessel 5 which is connected to the suction side of the steam-jet thermocompressor or ejector 80. The steam-jet ejector 80 is operated by the motive steam supplied by a line 34, in order to maintain in the expansion vessel 5 a suction pressure which is lower than the pressure prevailing in the auxiliary regeneration column 3, while the discharge pressure of the ejector 80 is adjusted so that the mixture of flashed vapour exhausted from expansion vessel 5 is recompressed to the pressure prevailing in the auxiliary regeneration column 3.

The recompressed mixture of flashed vapour and motive steam is delivered through line 35 to the auxiliary regeneration column 3 where it is used as stripping steam.

The total amount of stripping steam available in the auxiliary stripping column 3 will thus be made up in part of the steam liberated by flashing of the solution supplied from the main stripping column 2, through lines 24 and 33 and in part by the mixture of flashed vapour and motive steam provided by the steam-jet thermocompressor 80 through line 35.

Depending on the relative pressure differences which exist between the columns 2 and 3 on the one hand, and the column 3 and expansion vessel 5 on the other hand, the relative amounts of these steam supplies will vary in importance.

After flashing in expansion vessel 5, the semi-lean solution flows through a line 28 and is pumped by a pump 82 to an intermediate level of the absorber 1 through a line 281 and a cooler 92 where its temperature can be adjusted to the desired value. The mixture of desorbed acidic gas and residual stripping steam at the top of the auxiliary column 3 flows through a line 32 where it mixes with the desorbed acidic gas and steam mixture release by the main column 2 through a pressure reducing valve 54.

The combined flows are cooled in a cooler 93 where the major part of the steam condenses. The regeneration condensate which is collected in a reflux drum 6, from where the acidic gas leaves the unit, through a line 37, flows through a line 29 to a pump 83. After preheating in an exchanger 99, it is delivered either to a boiling kettle 95 where it is vapourized to produce motive steam to be used in the steam ejector, or returned through a valve 62 to the main regeneration column 2 as process reflux, or if desired evacuated out of the system through a valve 63. The preheating of the condensate which in this case occurs in an exchanger 99, can be realized in various ways.

Sometimes it is preferred to recover for this purpose the heat contained in the acidic gas-steam mixture of line 32 before it is cooled in exchanger 93, or it may be chosen to use the hot semi-lean solution of line 28 as the heating medium. These various modifications have in common that the preheating of the condensate is achieved with heat which is available within the regeneration system, in order to reduce the overall external heat requirement. If a separate cooler and condensate drum are provided for the overhead vapour from column 2, it is possible to avoid any pressure reduction of said acidic gas stream, which can thus be delivered at the same higher pressure level at which it has been desorbed.

When the process feed gas which has to be purified in absorber 1 is available at a sufficiently high temperature as is the case for some industrial process gases, it can conveniently be used as the heating medium in kettle 95 where the motive steam can be produced. As the motive steam is usually required at a pressure of 5 to 6 kg/cm$^2$, the temperature of the process gas leaving the kettle 95 through line 36 will still be high enough to be used as heating medium in the solution reboiler 90.

After having passed through the heating coils 36 of the reboiler 90, the process gas has to be cooled furtherdown and this can for instance occur in a boiler feed water heater.

After such a series of cooling operations, the process gas can then be introduced in the absorption column 1 through line 30.

When the process gas which must be purified is available at a lower temperature, as is the case with some natural gas streams, it is usually more convenient to use medium or low pressure steam as a heating medium in the solution reboiler 90 and the steam kettle 95.

The flow-sheet of FIG. 1 shows clearly the difference between the process according to this invention and the previously known dual-pressure regeneration methods, according to which the solution from the auxiliary column 3, which operates at the lower pressure level, flows directly through the lines 27 and 271 to the line 229 and pump 82 from where it is returned to the absorber 1 after temperature adjustment in cooler 92.

One obvious difference between the two methods of operation is that in the new method of this invention part of the cooling of the solution is realized in expansion vessel 5 and that consequently an important part of the heat which must otherwise be wasted in cooler 92 is recovered in a useful manner by way of the steam-jet thermocompressor 80.

An advantage of the process according to this invention is that this heat saving can be used either to decrease the overall heat requirement of the system or to decrease the severity of the operating conditions without however increasing the heat consumption.

Further research has shown that the same overall thermal efficiency can be achieved even if the pressure difference between the main regeneration column 2 and the auxiliary regeneration column 3 is reduced, provided that a sufficient pressure difference is applied by the steam-jet thermocompressor between the expansion vessel in which the solution flashes and the regeneration column in which the recompressed flashed mixture is discharged.

Figure 2:
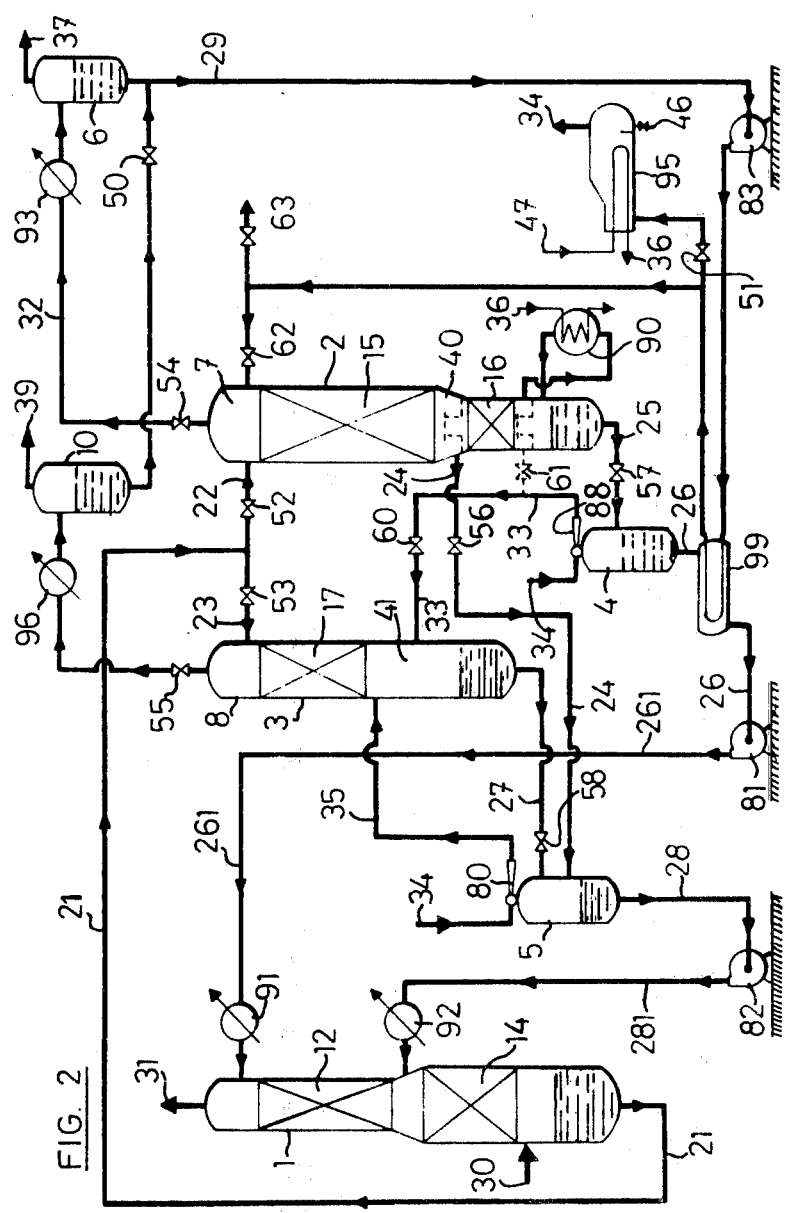

It is thus possible, as shown in FIG. 2, to adjust the flow-sheet of the regeneration process in such a way that the direct flashing of the solution from the pressure level of the main regeneration column 2 to the pressure level of the auxiliary regeneration column 3 is avoided, so that all the flashing occurs upon pressure let-down between the pressure levels of anyone of the two regeneration columns and the pressure level of an expansion vessel connected to the suction side of a steam-jet ejector.

As the transfer of heat and of stripping steam from the main regeneration column 2, which receives the reboiler heat, to the auxiliary column 3 which has no reboiler is not controlled by the operation of steam-jet thermocompressors 80 and 88, it becomes possible to vary the relative pressure levels of the main and of the auxiliary columns in such a way that, if desired, the main regeneration column 2 with solution reboiler 90 may operate at a lower pressure level than the auxiliary regeneration column 3.

It has also been found that it is possible to adjust the operating conditions so that the reboiler heat duty of the solution reboiler 90 of the main regeneration column 2 is decreased to such an extent that less than half of the total heat requirement for the production of stripping steam in the regeneration system is supplied through the solution reboiler. Although it is always possible to eliminate completely the solution reboiler by using live steam, such a practice requires that an equivalent quantity of process condensate should be removed from the system. The reduction of reboiler duty to which reference is made corresponds to a water balance of the regeneration system which is maintained in equilibrium, so that there is no need to evacuate process condensate out of the system.

As shown in FIG. 1 and 2, the spent scrubbing solution from the absorber 1 is split in two fractions which are regenerated separately, in two regeneration columns 2 and 3. As the pressure may be adjusted independently on each column, it also follows that the two fractions of desorbed acidic gas may be obtained at two different pressure levels.

This implies that, for the fraction which is obtained at the higher pressure level, the cost of recompression for further processing is decreased.

As shown in FIG. 2, the two streams of desorbed acidic gas from columns 2 and 3 are cooled separately in coolers 93 and 96 and evacuated through separate lines 37 and 39. The process condensates which have been collected separately in two different reflux drums 6 and 10 may however conveniently be mixed in line 29 for further reuse.

If it is desired to obtain the totality of the desorbed acidic gas at the same pressure, it may be more advantageous to deliver all the spent scrubbing solution coming from the absorber 1 to a single flashing zone after which one fraction of the flashed solution will be regenerated in the main regeneration column 2 and a second fraction will be regenerated in the auxiliary column 3, in which, according to the present invention, the stripping steam is supplied either exclusively or partially by flashing of the solution which has been induced by a pressure reduction produced by a steam-jet ejector which also recompresses the flashed vapour mixture to the required pressure level, the other part of the steam supply being obtained by flashing of the solution upon pressure let-down from the higher regeneration pressure level to the lower regeneration pressure level.

Further research has shown that the process of this invention also applies if, after the initial flashing of the single stream of spent solution coming from the absorber 1, some regeneration has been performed in the main regeneration column and the separation of the solution in two fractions occurs under form of the withdrawal of a side-stream of already partially regenerated solution which is then further regenerated separately in an auxiliary column with stripping steam which is supplied according to the method of this invention.

Figure 3:
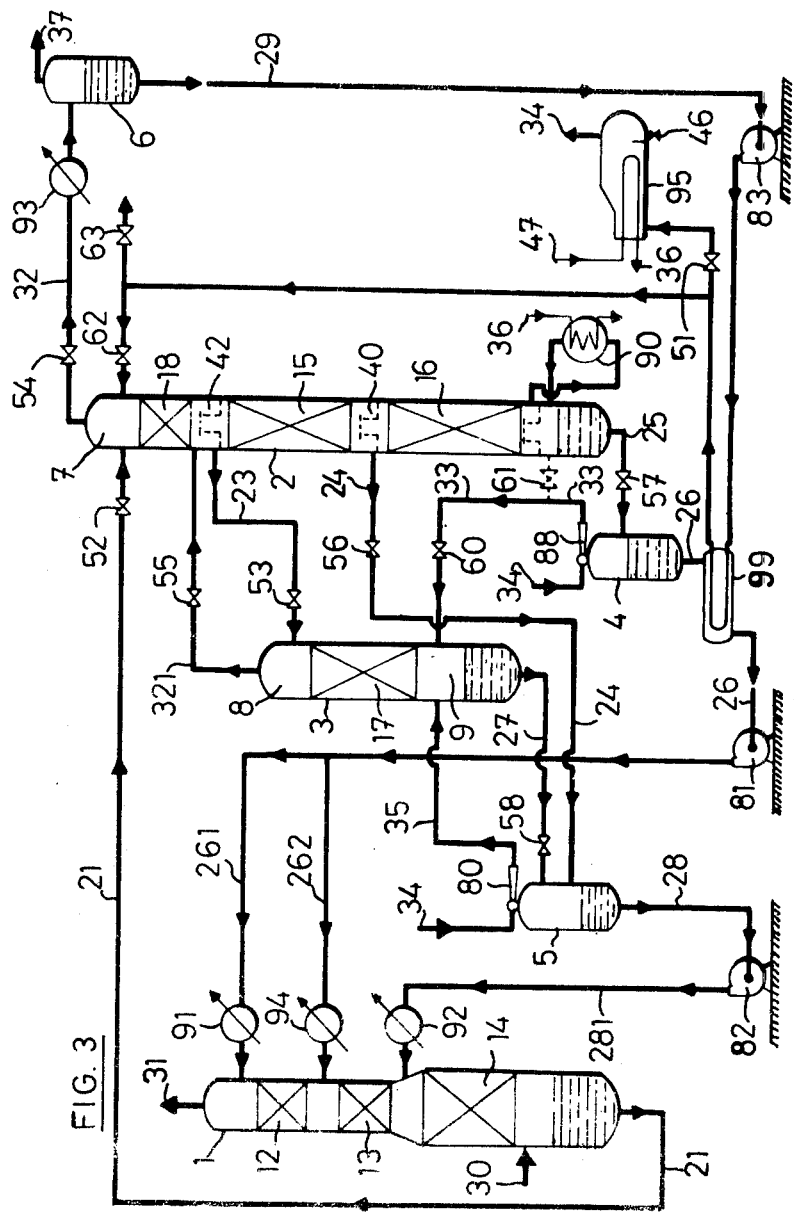

For a better understanding of this embodiment of the invention, reference is made to FIG. 3 of the drawings.

The spent scrubbing solution leaving the base of absorber 1 by line 21 flows through the pressure reducing valve 52 to the main regeneration column 2. After flashing in the flash zone 7, the solution flows downwards to the regeneration zone 18. A first part of the partially regenerated solution is withdrawn from draw-off plate 42, whilst the remainder of the solution flows to the regeneration zone 15. A second fraction of the solution may be withdrawn from the column at the draw-off plate 40, and the remainder of the solution flows to the regeneration section 16, and from there to the solution reboiler 90, and the bottom of the regeneration column 2.

According to the embodiment of the invention, as represented in FIG. 3, the auxiliary regeneration column 3 is situated at a lower elevation level than the draw-off pan 42. The first fraction of solution, withdrawn from draw-off pan 42, flows through line 23 to the valve 53 and auxiliary column 3. The difference in level between draw-off pan 42 and the auxiliary regeneration column 3 can easily be adjusted so that the hydrostatic head created in line 23 is sufficient to overcome the higher operating pressure which is maintained in the auxiliary column 3.

As the solution coming from draw-off plate 42 enters in column 3, there is no flashing in flash zone 8, because of the higher operating pressure. In the auxiliary column 3, the solution flows to the regeneration zone 17, where it is heated to its boiling temperature under the prevailing higher pressure, and regenerated by the counter-current stream of stripping steam which rises from the base of the column 3.

The stripping steam and the desorbed acidic gas flow through line 321 and valve 55 to the main regeneration column 2. The regenerated solution which collects at the base of column 3 flows through line 27 and pressure reduction valve 58 to the expansion vessel 5 which is connected to the suction side of the steam-jet ejector 80, which maintains in said vessel the desired lower pressure.

The vapour mixture which is given off by flashing is recompressed in the steam-jet thermocompressor 80 and discharged together with the motive steam through line 35 at the base of the auxiliary column 3.

The flashed solution collecting at the base of expansion vessel 5 flows through line 28 and is pumped by pump 82 to an intermediate level of absorber 1 after temperature adjustment in cooler 92. A second fraction of partially regenerated solution which may be withdrawn from the main regenerator 2 at draw-off pan 40 flows through pressure reducing valve 56 and line 24 to the expansion vessel 5 where the flashed vapour mixture is evacuated and recompressed by the steam-jet ejector 80 which discharges through line 35 in column 3. The lean solution which collects at the base of the main regeneration tower 2 flows through line 25 and pressure reducing valve 57 to the expansion vessel 4 which is connected to the suction side of steam-jet ejector 88. The flashed vapour mixture is evacuated and recompressed by the steam-jet ejector 88 to the pressure prevailing in column 3 and the mixture of motive steam and recompressed flashed vapour is discharged through line 33 and valve 60 to the auxiliary column 3.

The supply of stripping steam in the auxiliary regeneration column 3 is thus made up of the discharge flow of the steam-jet thermocompressors 80 and 88.

As shown in FIG. 3, it is possible, if the total stripping steam supply exceeds the requirements of column 3, to discharge part or all of the output of the steam-jet thermocompressor 88 to column 2 through valve 61.

The lean flashed solution in expansion vessel 4 flows through line 26 to pump 81 and is pumped in split-flow partly through line 261 to the top of the absorber 1 after cooling in cooler 91, and partly through line 262 to an intermediate level of the absorber 1 after temperature adjustment in cooler 94. At the top of the main regeneration column 2, the mixture of desorbed acidic gas and overhead steam is cooled in the overhead cooler-condenser 93. The acidic gas is evacuated from the condensate reflux drum 6 through line 37. The regeneration condensate flows through line 29 and pump 83 to the steam kettle 95.

The application of the invention is not limited to the regeneration of one single scrubbing solution. It is also suited for improving the regeneration of an acidic gas scrubbing system where two different scrubbing solutions are used, in order to achieve a more complete removal of the acidic gas.

Figure 4:
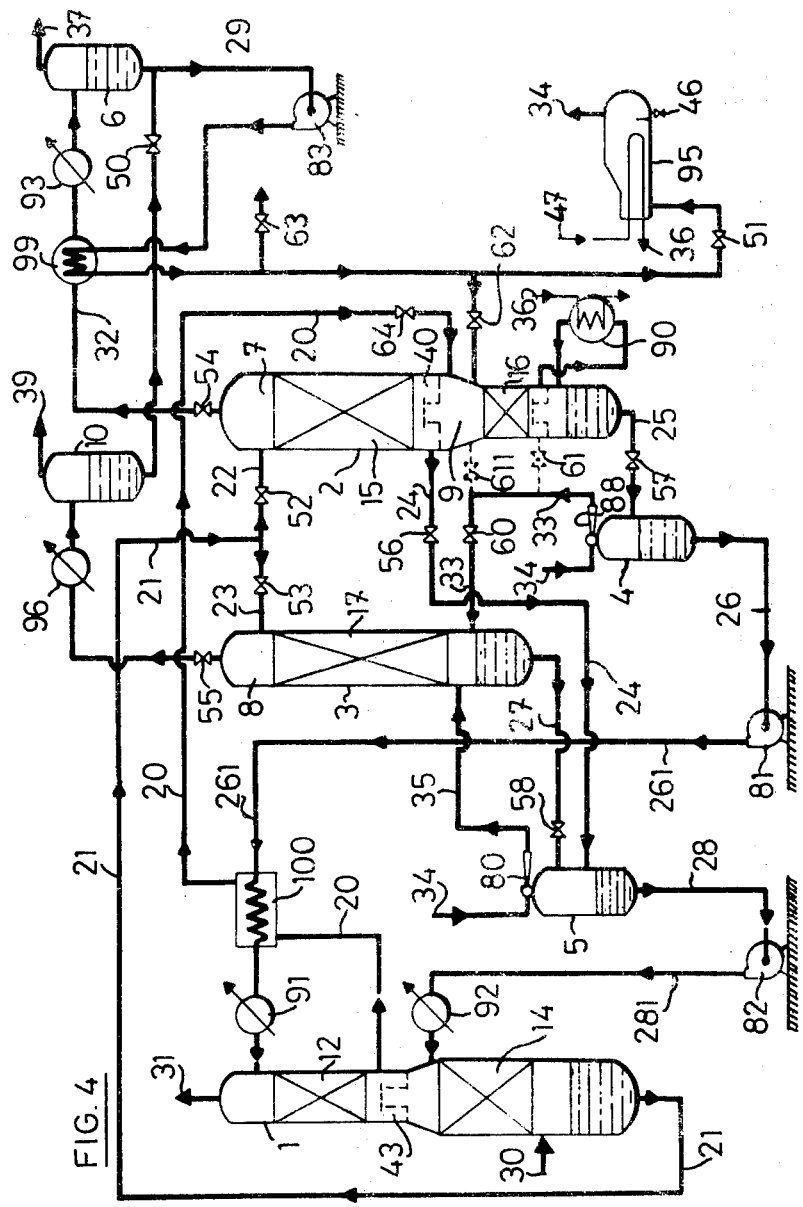

Reference is made to FIG. 4 of the drawings which shows the flow-sheet of a $CO_2$ removal unit, in which a first scrubbing solution is used for the removal of the major fraction of the acidic gas, and where a second aqueous solution is used to remove more completely the remaining fraction of acidic gas.

The first scrubbing solution is for instance a potassium carbonate solution containing any of the usual activating additives, such as diethanolamine, while the second solution may be another aqueous solution capable of reducing more effectively the residual partial pressure of the acidic gas in the process gas which must be purified. It is most convenient to use as second scrubbing solution an aqueous solution of diethanolamine or an aqueous solution of the potassium salt of an aminoacid such as dimethylglycine.

The process gas stream containing the acidic gas is introduced through line 30 at the base of the absorber 1, where it flows upwards successively through a first absorption zone 14 which is usually maintained at a temperature close to the atmospheric boiling temperature of the solution and a second absorption zone 12 which is maintained at a significantly lower temperature, and leaves the top of the absorber 1, after purification through line 31.

The spent hot scrubbing solution from the first absorption zone 14 collects at the base of the absorber 1 and flows through line 21, in part to the main regeneration column 2 and in part to the auxiliary column 3. The part of the solution which flows to column 2 through the pressure reducing valve 52 and line 22 flashes in flash zone 7 and flows towards the regeneration zone 15 where it is regenerated by the stripping steam rising from the lower part of the column, and collects in draw-off pan 40. This regenerated solution leaves column 2 through line 24 and flows through the pressure reducing valve 56 to the expansion vessel 5 which is maintained at the lower pressure by the suction side of the steam-jet ejector 80.

The second part of the scrubbing solution from line 21 flows through the pressure reducing valve 53 and line 23 to the auxiliary column 3, where after passing through the flash zone 8 it flows downwards to the regeneration zone 17, countercurrently to the rising flow of stripping steam. The regenerated solution collects at the base of column 3 and flows through line 27 and the pressure reducing valve 58 to the expansion vessel 5, where the steam-jet ejector 80 maintains a lower pressure.

The total flow of the first scrubbing solution is thus collected in expansion vessel 5 and flows through line 28 to pump 82 from where it is recycled to the first absorption zone 14 of absorber 1, after temperature adjustment in cooler 92.

The second scrubbing solution from the colder second absorption zone 12 leaves the absorber 1 at draw-off pan 43 by line 20, and flows to the heat exchanger 100 where it is reheated by he recycled regenerated solution, and from there through the pressure reducing valve 64 to the lower regeneration section of the main regeneration column 2. After flashing in flash zone 9, it flows to the regeneration zone 16 and to solution reboiler 90 where the stripping steam is produced. The regenerated solution leaves the base of column 2 by line 25 and flows through pressure reducing valve 57 to expansion vessel 4 where a lower pressure is maintained by the suction side of the steam-jet ejector 88.

The flashed vapour is evacuated and recompressed by the steam-jet ejector 88 which discharges the mixture of motive steam and recompressed flashed vapour through line 33.

Depending on the relative steam requirements of the two regeneration columns 2 and 3, it is possible to supply the stripping steam mixture produced by thermocompressor 88 to either column, or to apportion part of it to each.

After flashing, the regenerated solution leaves expansion vessel 4 through line 26 and is pumped by pump 81 to heat exchanger 100 where it preheats the spent solution of line 20 which flows towards the regeneration section. After final temperature adjustment in cooler 91 it is returned to the second absorption zone 12 of the absorber 1.

The acidic gas which has been desorbed in the auxiliary column 3 is cooled in cooler 96 and is evacuated from the condensate reflux drum 10 by line 39, whereas the acidic gas desorbed in the main column 2 flows through line 32 to heat exchanger 99 where it preheats the process condensate and then to cooler-condenser 93. It leaves the condensate drum 6 through line 37. The regeneration condensate from the two condensate drums 10 and 6 flows to pump 83 and after preheating in heat exchanger 99, is sent to vaporuizing kettle 95 or may also be returned to the process as reflux through valve 62. The steam produced in kettle 95 is delivered as motive steam in steam collector 34 for the steam-jet ejectors 80 and 88.

It will be noted that in column 2 the stripping steam required in the second regeneration zone 16 is obtained mainly by reboiling the second stripping solution in reboiler 90.

After passing through this lower regeneration zone 16, the mixture of stripping steam and acidic gas which has been desorbed in said zone flows upwards to the first regeneration zone 15 where it is used to regenerate the first scrubbing solution. As in the absorber 1 only a minor fraction of the acidic gas has been absorbed in the second scrubbing solution, the quantity of acidic gas in the stripping steam emerging from the second regeneration zone 16 remains small, and said stripping steam mixture can be used efficiently in the first regeneration zone 15.

The stripping steam required in the auxiliary column 3 is supplied by the discharge of the thermocompressors 80 and 88.

As it was indicated previously, the invention makes it possible to select for each regeneration column the most appropriate pressure level, as the determining factor is the pressure difference which is applied between each of the regeneration columns and the expansion vessels.

As already pointed out, it has been chosen to describe the various single solution flow-sheet modifications with reference to an absorber operating always under the same terminal conditions (temperature of top and bottom of the absorber), according to an optimal cycle which incorporates the possibility of temperature adjustment of all the recycled solution streams. This particular feature was chosen only for the purposes of a meaningful comparison of the various modifications.

It is however clear to anyone skilled in the art that the application of the invention is not limited to a so-called optimal absorption cycle. The benefits of the invention, which refers specifically to the regeneration of the scrubbing solution, are equally applicable to any other operating conditions of the absorber, whether a temperature adjustment or cooling of the recycled solution streams is applied or not. The invention refers in fact to the method according to which the spent solution stream or streams is or are regenerated before recycling.

EXAMPLES

The following examples which illustrate the invention refer to the removal of $CO_2$ from an industrial process gas resulting from a catalytic steam reforming of natural gas, and which after $CO_2$ removal will be used for the synthesis of ammonia.

It is well known that $CO_2$ is an acidic gas for which the kinetics of absorption and desorption are relatively slow, as a result of which the regeneration of the spent scrubbing solution is somewhat more difficult than in the case of other acidic gases such as $H_2S$. It is thus appropriate to illustrate the invention with reference to a $CO_2$ removal process.

EXAMPLE 1

Reference is again made to FIG. 1 of the drawings which shows a cyclic acidic gas removal process, in which an aqueous potassium carbonate scrubbing solution is used. The process gas stream from which $CO_2$ must be removed is available at a temperature of 250° C, a pressure of 21.5 kg/cm², and a flow rate of 45,700 Nm³/hr (dry basis). It contains 0.4 Nm³ of water vapour per Nm³ of dry gas.

As an inlet temperature to the absorber of 80° C is desired, it is customary to recover the heat contained in the process feed gas by use of one or more heat exchangers, which may if desired be used to supply part or all of the heat requirements of the acidic gas removal system. For instance the hot process gas may be used first to produce low pressure steam at a pressure of 6 kg/cm² in the steam kettle 95 in which it enters through line 47. The process gas leaving kettle 95 through line 36 may then be sent to the solution reboiler, for the production of stripping steam in the main regeneration column 2, after which it may be further cooled to 80° C in a boiler-feed water heater (not shown).

The relative quantities of steam produced in kettle 95 and solution reboiler 90 will depend on the intermediate temperature of the process gas in line 36. For a temperature of 167° C, the steam production in kettle 95 will amount to 5900 kg/hr.

Before entering the absorber 1 which operates at a pressure of 21 kg/cm², the condensate which has been formed upon cooling of the feed gas is removed in a separator drum (not shown).

The process gas which enters the absorber 1 through line 30 contains 17.6% by volume of $CO_2$. The $CO_2$ which is absorbed by the scrubbing solution reacts with the potassium carbonate to form potassium bicarbonate according to the reaction:

$$K_2CO_3 + CO_2 + H_2O \rightarrow 2\ KHCO_3$$

The scrubbing solution thus contains a mixture of unconverted potassium carbonate and of potassium bicarbonate. The relative proportions of $K_2CO_3$ and $KHCO_3$ are indicated by the percent conversion.

The "potassium bicarbonate fraction" or "percent conversion" as used herein means the proportion of original $K_2CO_3$ expressed in percent which has been converted to potassium bicarbonate by reaction with $CO_2$. For example, a solution having a percent conversion of 20% is obtained by the conversion of 20 mols percent of the potassium carbonate content of the original solution to potassium bicarbonate, such that the ratio of the potassium ions present as $K_2CO_3$ to the potassium ions present as $KHCO_3$ is 80/20. Since two mols of $KHCO_3$ are produced for each mol of $K_2CO_3$, the mol ratio of $K_2CO_3/KHCO_3$ at 20% conversion is 80/40. As used herein the concentration of the solution, indicated as weight percent potassium carbonate, is referred to the original solution free from bicarbonate, i.e. with zero percent conversion.

The spent scrubbing solution which collects at the base of absorber 1 has a concentration of 29% by weight of $K_2CO_3$ and contains in addition to the usual corrosion inhibitors 3% by weight of diethanolamine. As the process feed gas flows upwards in the absorber 1 through the absorption zones 14 and 12, it is scrubbed by the hot semi-lean solution which is introduced at an intermediate level and by the cooled lean solution which is introduced at the top of the absorber at a temperature of 80° C. The residual $CO_2$ content of the cleaned process gas which leaves the absorber at a temperature of 80° C through line 31, is not more than 0.1% by volume.

The lean solution which has a conversion of 22% is introduced in the absorber at a flow rate equivalent to 18% of total flow rate of the spent scrubbing solution. The semi-lean solution which is introduced in the absorber at a temperature of 101° C and a flow rate corresponding to 82% of the total flow rate of the spent scrubbing solution has a conversion of 42.8%.

The spent scrubbing solution which leaves the base of the absorber 1 through line 21 at a flow rate of 378,000 kg/hr has a conversion of 84% and a temperature of 108° C. The load factor of the solution corresponds to 0.45 mole of $CO_2$ per mole of $K_2CO_3$, which is equivalent to an overall percent conversion change of 45%.

The spent scrubbing solution flow is divided in two parts. The major fraction of 60% flows through pressure reducing valve 52 and line 22 to the main regeneration column 2 and flash zone 7, where the operating pressure is set at 1.9 kg/cm². The minor fraction of 40% flows through pressure reducing valve 53 and line 23 to the auxiliary regeneration column 3 and flash zone 8 where the pressure is set at 1.3 kg/cm². In the main regeneration column 2, the solution flows downwards, after flashing, towards the regeneration zone 15 where it is scrubbed by the countercurrent flow of stripping steam which desorbs the acidic gas.

At the draw-off pan 40, a fraction of 70% of the partially regenerated solution flow is withdrawn at a temperature of 120° C and conversion of 46.3%, while the remaining fraction of 30% flows downwards to regeneration zone 16 and the solution reboiler 90. The heat which is supplied in the reboiler 90 by the hot feed gas supplied by line 36, upon cooling from 167° to 128° C corresponds to a steam production of 10,300 kg/hr which satisfies the stripping steam requirement in the main regeneration column 2. The $CO_2$ desorption rate in column 2 corresponds to 60% of the total acidic gas removal rate of 8,000 Nm³/hr of $CO_2$. The stripping steam requirement in column 2 thus corresponds to approximately 2.14 kg of steam per Nm³ of $CO_2$ desorbed in the column. Part of the steam which is supplied at the base of the column is condensed in the regeneration zone in order to satisfy the endothermic desorption heat requirement and also in order to maintain the solution at its boiling temperature. The remainder emerges at the top of the column as residual stripping steam.

In view of the fact that the heat content of the steam supply may vary according to the temperature and pressure of the system, it is preferable to refer to the regeneration heat requirement in terms of kilocalories per Nm³ of desorbed $CO_2$, which in this case corresponds to 1,165 kc/Nm³ $CO_2$.

The lean solution which collects at the base of column 2 at a temperature of 125° C has a conversion of 22%.

The minor fraction of 40% of the spent scrubbing solution in the auxiliary column 3 must be regenerated to a conversion of 39% in order to achieve the specified load factor or overall percent conversion change of 45%.

The heat requirement for this regeneration duty corresponds to 1,090 kc/Nm³ of $CO_2$ desorbed in the auxiliary column 3, or approximately 6,400 kg of steam for the desorption duty of 3,200 Nm³ $CO_2$, i.e. 40% of the total acidic gas removal duty, which is to performed in said auxiliary column.

The semi-lean solution from draw-off pan 40 flows at the rate of 156,000 kg/hr, i.e. 42% of the total solution flow, through the pressure reducing valve 56 and line 24 to the flash zone 9 at the base of the auxiliary column 3 where the operating pressure of 1.4 kg/cm² is slightly higher than at the top of the column. By flashing the solution produces 2,000 kg/hr of steam thereby cooling to 110° C. In addition to the steam, a small amount of $CO_2$ is released. Due to the slow kinetics of the desorption process the quantity of $CO_2$ which is given off by the flashing process is sufficiently small so that it does not interfere in a significant way with the regeneration process of the auxiliary column, and there is therefore no need, for the understanding of this example, to take it in account.

The lean solution which leaves the base of column 2 through line 25 and pressure reducing valve 57, flows to expansion vessel 4 where essentially the same pressure of 1.4 kg/cm² prevails as in flash zone 9 at the base of column 3. Steam is generated by flashing at the rate of 1,000 kg/hr thereby cooling the solution to 113° C.

The ratio of $CO_2$ to steam in the vapour mixture generated by flashing is in this case even smaller than in the case of the flashing of the semi-lean solution, and the small amount of $CO_2$ thus liberated can be neglected for the purpose of the present example.

The total amount of flashed steam produced both in flash zone 9 and in expansion vessel 4 corresponds to 3,000 kg/hr or approximately 0.94 kg of steam per Nm³ of $CO_2$ desorbed in column 3. As the heat thus supplied only amounts to 506 kc/$Nm^3$ $CO_2$, an additional heat input of 581 kc/$Nm^3$ $CO_2$ will be needed in order to satisfy the regeneration heat requirement.

According to the present invention, this additional heat supply is obtained through use of thermocompressor 80 which is operated with motive steam from line 34 produced at a pressure of 6 kg/$cm^2$ in kettle 95 by vapourization of process condensate.

The minor fraction of 40% of scrubbing solution which is regenerated in regeneration zone 17 of the auxiliary column 3 is collected on draw-off pan 41 at a temperature of 111° C and a percent conversion of 39%.

It flows through line 271 and pressure reducing valve 58 to the expansion vessel 5, together with the semi-lean solution leaving the bottom of column 3 through line 27. This combined flow of 305,000 kg/hr produces upon flashing to the reduced pressure of 1.2 kg/$cm^2$ which is maintained by the suction side of the steam-jet ejector 80 in vessel 5, 1,400 kg/hr of steam thereby cooling the combined solution flow which has now a conversion of 42.8% to 107° C.

The motive steam at a pressure of 6 kg/$cm^2$ used by the steam-jet ejector 80, in order to recompress the flashed steam to the pressure of 1.4 kg/$cm^2$ which exists at the base of column 3, amounts to 2,000 kg/hr.

The combined flow of 3,400 kg/hr of recompressed flashed steam and motive steam is discharged through line 35 at the base of column 3. As explained earlier, the small amount of $CO_2$ liberated by flashing may also be neglected for the purpose of the present explanation; it may be noted that its relative importance is further decreased by the diluting effect of the motive steam.

By use of this steam-jet thermocompressor 80, which uses 1 kg of motive steam at a pressure of 6 kg/$cm^2$ to recompress 0.7 kg of flashed steam, thus producing 1.7 kg of stripping steam, the external heat supply which is required in order to satisfy the regeneration heat demand of column 3 amounts to 59% only of the additional heat demand of 581 kc/$Nm^3$ $CO_2$.

The external heat input thus amounts to 341 kc/$Nm^3$ $CO_2$ of motive steam, the balance being obtained from the solution itself by flashing and recompression.

The overall regeneration heat requirement of the cyclic process is defined by combining the external heat supply to the main regeneration tower 2 through the solution reboiler 90, and the external heat supply to the auxiliary column 3 under form of motive steam.

To the external regeneration heat supply in the solution reboiler of 1,165 kc/$Nm^3$ $CO_2$ for the desorption of 4,800 $Nm^3$/hr of $CO_2$ in the main column 2, must be added the supply of 341 kc/$Nm^3$ $CO_2$ for the 3,200 $Nm^3$/hr of $CO_2$ desorbed in the auxiliary column 3. This corresponds to an overall heat requirement of 836 kc/$Nm^3$ of $CO_2$ calculated on the basis of the total acidic gas removal duty of 8,000 $Nm^3$/hr of $CO_2$.

The semi-lean solution which leaves expansion vessel 5 through line 28 is pumped by pump 82 through line 281 to the intermediate level of absorber 1, after having been cooled to 101° C in cooler 92.

The lean solution from expansion vessel 4 flows to heat exchanger 99, where it preheats the process condensate to 100° C. It is pumped by pump 81 through line 261 to the cooler 91 where it is cooled to 80° C and from there to the top of absorber 1.

The desorbed $CO_2$ and the residual stripping steam from the auxiliary column 3 flow through line 32 and cooler condenser 93 to the condensate separator drum 6 which are all maintained at essentially the same pressure level of 1.3 kg/$cm^2$. The desorbed $CO_2$ from the main column 2, which represents 60% of the total $CO_2$ or 4,800 $Nm^3$/hr flows together with the residual stripping steam through the pressure reducing valve 54 into line 32 where it mixes with the flow coming from the auxiliary regeneration column 3. The combined stream of 8,000 $Nm^3$/hr of desorbed $CO_2$ is evacuated at a temperature of 60° C from the unit through line 37, while the overhead process condensate leaves vessel 6 through line 29 at a rate of 7,400 kg/hr. The process condensate is pumped by pump 83 to the exchanger 99, where it is heated from 60° to 100° C, after which part of it is sent to the kettle 95 to produce the required amount of motive steam for the steam-jet ejector 80 and the remainder is returned as process reflux to the main regeneration column, through valve 62.

It is quite obvious that, if desired, the major flow of 4,800 $Nm^3$/hr of $CO_2$ which has been desorbed at a pressure of 1.9 kg/$cm^2$ can easily be discharged from the acid gas removal unit at this higher pressure by way of a suitable piping set up such as is illustrated in FIG. 2.

This example can easily be compared with the prior art practice of regeneration.

It was indicated that the stripping steam demand of the auxiliary column 3 amounted to approximately 2 kg of steam per $Nm^3$ of $CO_2$ desorbed in the column, or a total of 6400 kg/hr, whereas the steam produced upon flashing in flash zone 9 and expansion vessel 4 amounted only to 3000 kg/hr. The additional requirement of 3,400 kg/hr could of course be satisfied by way of a solution reboiler.

Instead of sending the semi-lean solution streams from column 3 to the expansion vessel 5, they could be circulated through a solution reboiler, where an additional heat input of 581 kc/$Nm^3$ $CO_2$ would produce the required amount of additional stripping steam.

As compared with the method of the invention, the use of the reboiler requires a greater heat input, together with the increased solution temperature which prevails in a reboiler, as against a solution cooling in expansion vessel 5.

According to another method of the prior art, it is possible to operate the cyclic process of FIG. 1 without an additional reboiler or without use of the present invention, if the combined semi-lean solution flow from column 3 is sent directly through line 229 to pump 82. The operating conditions must then be modified in order to balance the steam demand and supply in column 3. If the same regeneration pressure levels of 1.9 kg/$cm^2$ and 1.3 kg/$cm^2$ are maintained, the major fraction of solution regenerated in column 2 must be increased to 76.2% and the solution flow to the auxiliary column decreased to 23.8%.

The overall heat input to the system, which is now limited to the single solution reboiler 90, has increased in the ratio of solution flow to the main column and corresponds to 888 kc/$Nm^3$ $CO_2$. It is however possible to increase the thermal efficiency of this method of operation by increasing the pressure on the main regeneration column in order to decrease as much as possible the heat loss resulting from the flashing in flash zone 7. If the pressure is increased to a value which is equivalent to the vapour pressure of the spent scrubbing solution, essentially no flashing would occur in flash zone 7. In the case of this example, a pressure of 3 kg/cm² would be required. There is a corresponding increase of the heat requirement in column 2, which now amounts to 1,435 kc/Nm³ of desorbed $CO_2$, but the overall heat requirement is decreased to 865 kc/Nm³ as only 60.3% of the spent scrubbing solution must be regenerated in column 2. The temperature of the solution at the base of column 2 has however increased to 139° C.

The data concerning example 1 and the comparison with prior art practice are summarized in Table 1. Experiment N. 1 refers to the prior art practice as shown in FIG. 1 of the drawings, where the combined semi-lean solution streams leaving column 3 through lines 27 and 271 flow through line 229 directly to pump 82 and are recycled to the absorber 1 without further treatment. Experiment N. 2 refers to the prior art practice where an additional reboiler is used for the auxiliary column 3. Experiment N. 3 refers to example 1 of the present invention.

TABLE 1

| Experiment n° | 1 | 2 | 3 |
|---|---|---|---|
| 1 Pressure at top of column 2/3 (kg/cm2) | 3/1.3 | 1.9/1.3 | 1.9/1.3 |
| 2 Temperature at base of column 2/3 (° C) | 139/111 | 125/111 | 125/111 |
| 3 Total external heat input kc/Nm3 $CO_2$ | 865 | 931 | 836 |

EXAMPLE 2

Reference is made to FIG. 2 of the drawings. The same process feed gas and scrubbing solution are used as in example 1. The same amount of $CO_2$ is removed from the feed gas in absorber 1 where the operating conditions are the same as in example 1, except for the following modification. The lean solution flow rate has been decreased to 15% of the equivalent total flow rate of spent scrubbing solution. Its temperature and conversion are maintained at 80° C and 22%. The semi-lean solution flow rate is now equivalent to 85% of the total flow rate of spent scrubbing solution. Its conversion is now 42% and the temperature 100° C. The spent scrubbing solution collects at the base of the absorber at the same temperature and conversion of 108° C and 84% and its flow rate is unchanged at 378,000 kg/hr. The load factor of 0.45 mole $CO_2$ per mole $K_2CO_3$ is unchanged.

The spent scrubbing solution flowing through line 21 is split in two equal fractions of 50% which are regenerated separately in the main regeneration column 2 and in the auxiliary column 3. The operating pressure of the main regeneration column is set at 1.3 kg/cm² while the operating pressure of the auxiliary column is adjusted to the slightly higher pressure of 1.5 kg/cm². The solution flowing through valve 52 and line 22 to the main regeneration column 2 flashes in flash zone 7 and flows to the regeneration zone 15. A fraction of 70% of the partially regenerated semi-lean solution with percent conversion of 46.3% is withdrawn from draw-off plate 40, at a temperature of 109° C and the remaining fraction of 30% equivalent to 15% of the total solution flow flows to regeneration zone 16 of the main regeneration column 2 and the solution reboiler 90.

After reboiling, the lean solution with a conversion of 22% and a temperature of 115° C collects at the bottom of the column 2.

The second fraction of 50% of the spent scrubbing solution which flows through pressure reducing valve 53 and line 23 to the auxiliary regeneration column 3 flashes in flash zone 8 and flows towards the regeneration zone 17.

The semi-lean solution from column 3 must be regenerated to a conversion of 39% in order to achieve the specified overall percent conversion change of 45%. This requires a regeneration heat supply of 1,115 kc/Nm³ of $CO_2$ desorbed in the column 3, which is equivalent to approximately 8,200 kg/hr of stripping steam. This stripping steam will be supplied by the steam-jet thermocompressor 80 which discharges through line 35 into column 3.

The suction side of the steam-jet ejector 80 is connected to the expansion vessel 5 where a pressure of 1.1 kg/cm² is maintained. The semi-lean solution flow of 130,000 kg/hr which is withdrawn from draw-off pan 40 flows through line 24 and pressure reducing valve 56 to expansion vessel 5 where 900 kg/hr of steam are generated by flashing, thereby cooling the solution to 103° C. The semi-lean solution which collects at base of auxiliary column 3 at a temperature of 115° C and conversion of 39% flows at the rate of 185,000 kg/hr through line 27 and pressure reducing valve 58 to expansion vessel 5 where 2,200 kg/hr of steam are produced by flashing thereby cooling the solution to 105° C. The motive steam of 6 kg/cm² pressure produced in kettle 95 is supplied to the steam-jet ejector 80 by line 34 at a flow rate of 5,100 kg/hr and the recompressed mixture of flashed vapour and motive steam is discharged by the thermocompressor 80 through line 35 at the pressure of 1.64 kg/cm² which prevails at the base of column 3, at a flow rate of 8,200 kg/hr.

The regeneration heat demand of column 3 has thus been satisfied to an extent of 62% by an external supply of motive steam and to an extent of 38% by heat extracted from the solution itself by the thermocompression action of a steam-jet ejector.

The external heat supply to auxiliary column 3 therefore amounts to 62% of the regeneration heat requirement of 1,115 kc/Nm³ $CO_2$, i.e. 692 kc per Nm³ of $CO_2$ desorbed in column 3.

As the heat demand of auxiliary column 3 is fully satisfied by the steam supplied by the steam-jet thermocompressor 80, it is possible to use the additional steam supply discharged by thermocompressor 88 as stripping steam in the main regeneration column 2.

The lean solution at the base of column 2 flows through line 25 and pressure reducing valve 57 to the expansion vessel 4, which is connected to the suction side of the steam-jet ejector 88, which maintains in said vessel a reduced pressure of 1 kg/cm². Steam is generated by flashing at a rate of 600 kg/hr thereby cooling the solution to 106° C.

Motive steam produced at a pressure of 6 kg/cm² in kettle 95 is supplied through line 34 at the rate of 1000 kg/hr to the steam-jet ejector 88 and the recompressed mixture of flashed vapour and motive steam is discharged through valve 61 at the pressure of 1.5 kg/cm² which prevails at the base of column 2.

When it is thus chosen to return the total output of 1,600 kg/hr of steam from thermocompressor 88 to column 2, valve 60 of line 33 is closed. The regeneration heat requirement in main column 2 amounts to 1,044 kc per $Nm^3$ of $CO_2$ desorbed in the column, which is equivalent to a stripping steam supply of 7,700 kg/hr. As the steam-jet thermocompressor 88 already supplies approximately 20% of the total demand of column 2, the heat supply by solution reboiler 90 will be reduced in the same proportion and will amount to 838 kc per $Nm^3$ of $CO_2$ desorbed in column 2. The total external regeneration heat supply to column 2 will thus be made up of 838 kc/$Nm^3$ $CO_2$ from reboiler 90 and 62 kc/$Nm^3$ $CO_2$ under form of motive steam, or a total of 900 kc/$Nm^3$ $CO_2$ desorbed in column 2. As the total regeneration duty is divided in equal parts between the main column 2 and the auxiliary column 3, where the respective external heat requirements are 900 kc/$Nm^3$ $CO_2$ and 692 kc/$Nm^3$ $CO_2$, the combined overall external heat supply will amount to 796 kc per $Nm^3$ of $CO_2$ removed from the spent scrubbing solution.

After flashing in vessel 4, the lean solution flows through exchanger 99 where the regeneration condensate is preheated to 100° C and is pumped by pump 81 through line 261 to the cooler 91 where it is cooled to 80° C before entering the top of absorber 1. The combined semi-lean solution flow from expansion vessel 5 with a percent conversion of 42% flows through line 28 to pump 82 from where it is recycled to absorber 1 after cooling in cooler 92 to a temperature of 100° C. The overhead mixture of steam and $CO_2$ from the main column 2 flows through line 32 to cooler 93 and reflux drum 6 where the condensate is separated while the cooled $CO_2$ is discharged at a pressure of approximately 1.3 kg/$cm^2$ and a temperature of 60° C through line 37, at a flow rate of 4,000 $Nm^3$/hr. The other fraction of acidic gas which is desorbed in auxiliary column 3 is evacuated at the higher pressure of 1.5 kg/$cm^2$ through line 39 after having been cooled to 60° C in cooler 96. The condensate from reflux drum 10 flows through pressure reducing valve 50 into line 29 through which it flows jointly with the condensate from reflux drum 6 at a combined flow rate of 8,700 kg/hr and temperature of 60° C to pump 83. From there it is pumped to heat exchanger 99 where it is reheated to 100° C after which it flows at a rate of 6,100 kg/hr to vapourizing kettle 95 where the corresponding amount of motive steam is produced at a pressure of 6 kg/$cm^2$ by the hot feed gas which is supplied by line 47 and leaves the kettle 95 by line 36 at a temperature of 164° C. The remainder of the regeneration condensate is returned as reflux to the main column 2 through valve 62.

It will be noted that, according to this mode of operation, the solution reboiler is operated at the lower regeneration pressure, and that the reboiler heat duty has been reduced to 419 kc/$Nm^3$ $CO_2$.

EXAMPLE 3

Reference is made to FIG. 3 of the drawings. The scrubbing solution composition and load factor is the same as in example 2, as well as the percent conversion, temperature and flow rate of the streams of lean and semi-lean solutions entering the absorber and of spent scrubbing solution leaving the absorber. The recycle solution line 262 and cooler 94 are not used. The same feed gas is used as in example 2.

The spent scrubbing solution, with a conversion of 84% and temperature of 108° C, flows through line 21 and pressure reducing valve 52 to the flash zone 7 of the main regeneration column 2 where the pressure is set at 1.5 kg/$cm^2$.

At draw-off pan 42, below regeneration zone 18, where the pressure is approximately 1.6 kg/$cm^2$, a fraction of 50% of the partially regenerated solution is withdrawn at a temperature of 110° C and conversion of 55%. The remaining 50% fraction flows down to regeneration zone 15 and draw-off pan 40 where a fraction of 70% of the remaining semi-lean solution, i.e. 35% of the total flow entering the top of the column is withdrawn at a temperature of 113° C and conversion of 46.3%. The remaining fraction of 15% flows to regeneration zone 16, and after passing through solution reboiler 90, collects at the bottom of the column at a temperature of 118° C and conversion of 22%.

The partially regenerated solution withdrawn from draw-off pan 42 flows through line 23 to the auxiliary column 3, which is situated at a lower elevation, which is such that the hydrostatic pressure of the solution in line 23 is sufficient to overcome the difference in pressure between columns 2 and 3. In this example, the difference in height between draw-off pan 42 and pressure reducing valve 53 is 2 m., which corresponds to a hydrostatic head of approximately 0.25 kg/$cm^2$, and the pressure in auxiliary column 3 is 1.7 kg/$cm^2$, i.e. 0.1 kg/$cm^2$ more than at draw-off pan 42.

Because of the increased pressure in flash zone 8, there is no flashing of the solution, which after regeneration in regeneration zone 17 collects at the base of the column.

In order to satisfy the constant load factor of the solution of 45% overall percent conversion change, the solution stream in column 3 must be regenerated to a conversion of 39%. For this regeneration duty, an increased amount of stripping steam is however required, so that the partial pressure of acidic gas in the vapour mixture which emerges at the top of regeneration zone 17 and is subsequently returned to the main column 2, by line 321, is maintained at a value which is sufficiently low to ensure that said vapour mixture will still have an adequate stripping efficiency when transferred in the main column 2.

As a conversion change of only 16% is performed on a fraction of 50% of the total solution, this will correspond to a desorption of 1.420 $Nm^3$/hr of $CO_2$. The stripping steam which must be supplied to column 3 corresponds to 5.7 kg steam per $Nm^2$ of $CO_2$ or approximately 8,100kg/hr.

According to the invention, this stripping steam demand is satisfied by the discharge flow of the steam-jet ejector 80. The semi-lean solution regenerated in column 3 to a conversion of 39% and a temperature of 116° C flows through line 27 and pressure reducing valve 58 to the expansion vessel 5, in which the suction side of the steam-jet ejector 80 maintains a reduced pressure of 1.2 kg/$cm^2$. The flashing induced by this descrease in pressure generates 2,100 kg/hr of steam thereby cooling the solution to 105° C. The semi-lean solution which is withdrawn from the main column 2 at draw-off pan 40, flows through line 24 and pressure reducing valve 56 to expansion vessel 5, where the flashing generates 1,200 kg/hr of steam, thereby cooling the solution to 105° C.

The motive steam, which is supplied from kettle 95 through line 34, at a pressure of 6 kg/$cm^2$ and a flow rate of 4,800 kg/hr recompresses the combined flashed vapours to a pressure of 1.8 kg/$cm^2$ which corresponds to the pressure at the base of column 3, where it discharges the mixture of motive steam and recompressed flashed vapour through line 35. The regeneration heat requirement of the auxiliary column 3 has thus been satisfied by an external heat supply under form of live motive steam, equivalent to 1,852 kc per $Nm^3$ of $CO_2$ desorbed in said column.

The regeneration heat demand in the main column 2 is now satisfied in part by the stripping steam supplied by the auxiliary column 3 through line 321, and the additional requirement corresponds to a stripping steam supply of 7,800 kg/hr at the base of the column, of which part will be supplied by the thermocompressor 88 through line 33 and valve 61, and part through the solution reboiler 90.

The lean solution at the bottom of the main column 2 flows through line 25 and pressure reducing valve 57 to the expansion vessel 4 where the suction side of the steam-jet ejector 88 maintains a reduced pressure of 1.15 $kg/cm^2$. The induced flashing generates 700 kg/hr of steam thereby cooling the solution to 108° C. The motive steam which is supplied at a pressure of 6 $kg/cm^2$ by kettle 95 through line 34, at a flow rate of 1,000 kg/hr recompresses the flashed vapour to the pressure of 1.7 $kg/cm^2$ which prevails at the base of column 2, where it discharges the mixture of motive steam and recompressed flashed vapour through line 33 and valve 61 at a flow rate of 1,700 kg/hr. During this operation valve 60 is closed so that no discharge steam from thermocompressor 88 is allowed to enter the auxiliary column 3.

The balance of 6,100 kg/hr of stripping steam supply is obtained from reboiler 90 which is heated by the hot synthesis feed gas.

If the heat supply to the reboiler is related to the overall acidic gas removal duty of 8,000 $Nm^3/hr$ of $CO_2$ it corresponds to 417 $kc/Nm^3$ $CO_2$ desorbed (overall). The motive steam used in the steam-jet thermocompressors 80 and 88 at a combined flow rate of 5,800 kg/hr corresponds to a heat supply, which is introduced in the regeneration system through vapourizing kettle 95, of 397 $kc/Nm^3$ $CO_2$ desorbed overall.

The combined regeneration heat demand of this regeneration method thus amounts to 814 $kc/Nm^3$ $CO_2$ removed. All the $Co_2$ which has been desorbed in the regeneration system is collected at the top of the main regeneration column 2 at a pressure of 1.5 $kg/cm^2$, from where it flows through line 32 to cooler 93 and discharge line 37 where it leaves the unit at a temperature of 60° C.

The overhead regeneration condensate which collects in reflux drum 6 at a rate of 8,000 kg/hr flows through line 29 and is pumped by pump 83 to heat exchanger 99 where it is preheated to 100° C, after which part of it is supplied to kettle 95 for the production of motive steam and the remainder is returned to the main column 2 as process reflux.

According to FIG. 3, it is shown that this reflux is returned through valve 62 at the top of column 2. It is however well known that it is equally satisfactory to return said reflux either to an intermediate level, or at the base of the regeneration column, or even directly into the side stream flowing into the solution reboiler 90.

According to another well known practice, it is also possible to return the cold process condensate into the system, without preheating in exchanger 99, directly into line 26.

These various modifications are equally applicable within the scope of the present invention.

After passing through heat exchanger 99, the lean solution is recycled by pump 81 and line 261 to the top of the absorber 1 after cooling to 80° C in cooler 91.

The semi-lean solution from vessel 5 with conversion of 42% is recycled to the absorber 1 by pump 82 through line 281 and cooler 92 where its temperature is adjusted to 100° C.

EXAMPLE 4

Reference is made to FIG. 4 of the drawings, which shows a dual solution scrubbing system in which an aqueous potassium carbonate solution is used for the bulk removal of $CO_2$ in the first absorption zone 14 of absorber 1, and a 20% by weight aqueous diethanolamine (DEA) solution is used in the second absorption zone 12 of absorber 1 for final cleaning of the gas. The same process feed gas is used as in example 1. After passing through the kettle 95, where upon cooling to 163° C it vapourizes 7,200 kg/hr of motive steam at a pressure of 6 $kg/cm^2$, solution reboiler 90 and another exchanger (not shown), the process feed gas enters absorber 1 which operates at a pressure of 21 $kg/cm^2$ through line 30 at a flow rate of 45,700 $Nn^3/hr$ (dry basis). After passing through the first absorption zone 14, where the $CO_2$ content is reduced to 1.6% by volume, the gas is further cleaned in the second absorption zone after which it leaves the absorber through line 31 at a temperature of 45° C and with a residual $CO_2$ content of not more than 0.01% by volume. The regenerated potassium carbonate solution is recycled to the absorber 1 through line 281 at a temperature of 101° C and a conversion of 41.5%. The spent potassium carbonate solution which collects at the base of absorber 1 has a concentration of 29% by weight of potassium carbonate, and contains, in addition to a small amount of corrosion inhibitor, 3% by weight of diethanolamine. It leaves through line 21, at a temperature of 110° C and a conversion of 84% at a flow rate of 371,000 kg/hr. The lean DEA (diethanolamine) solution is recycled to the top of the absorber 1 through line 261 at a temperature of 45° C and an acidic gas load of 0.08 mole $CO_2$ per mole of DEA. The spent DEA solution is withdrawn from absorber 1 at draw-off pan 43, at a temperature of 77° C and an acidic gas load of 0.38 mole per mole of DEA. It flows through line 20, at a flow rate of 47,000 kg/hr to heat exchanger 100, where it is preheated to 95° C, and after pressure reduction in valve 64, enters the lower regeneration section of the main regeneration column 2. After flashing in flash zone 9, where the operating pressure is 1.45 $kg/cm^2$, the solution flows to the regeneration zone 16 and to the solution reboiler 90. The heat supplied by the hot process feed gas from line 36, generates 4,800 kg/hr of steam. Part of this stripping steam is used in regeneration zone 16 to supply the heat for the endothermic desorption process and to heat the solution to its boiling temperature, while the remainder, together with the desorbed $CO_2$ flows upwards to the upper regeneration section where the potassium carbonate solution is regenerated.

The spent potassium carbonate solution leaving absorber 1 is divided in two parts. A fraction of 30% is sent through pressure reducing valve 52 and line 22 to the main regeneration column anf flash zone 7 where the pressure is set at 1.3 $kg/cm^2$.

After flashing the solution flows to regeneration zone 15 and to draw-off pan 40 from where it is withdrawn at a temperature of 109° C and a conversion of 46%.

The regeneration steam demand in zone 15 amounts to 4,600 kg/hr of which only 2,550 kg/hr are rising from the lower regeneration section. In order to satisfy the additional requirement, the lean DEA solution which leaves the bottom of the main column 2 through line 25 at a temperature of 112° C, is led to expansion vessel 4, where the suction side of the steam ejector 88 maintains a reduced pressure of 1.05 kg/cm$^2$. The flashing of this solution upon pressure reduction through valve 57, generates 800 kg/hr of steam, which are recompressed by the thermocompressor 88, which is operated with 1,250 kg/hr of motive steam at a pressure of 6kg/cm$^2$, supplied by kettle 95 through the steam collector 34. The thermocompressor 88 discharges the mixture of recompressed flashed vapour and motive steam through line 33 and valve 611 to the flash zone 9 at a flow rate of 2,500 kg/hr. During this operation, the valves 61 and 60 are maintained closed.

The second fraction of 70% of the spent potassium carbonate solution flows through the pressure reducing valve 53 and line 23 to the auxiliary regeneration column 3 and flash zone 8 where the pressure is set at 1.4 kg/cm$^2$.

In order to satisfy the specified overall conversion change of 42.5%, the regeneration in the auxiliary column must be carried through to a conversion of 39%. The corresponding regeneration steam demand of 10,100 kg/hr is supplied by the steam-jet ejector 80. The regenerated solution from draw-off pan 40 flows through line 24 and pressure reducing valve 56 to the expansion vessel 5 where the suction side of the steam-jet ejector 80 maintains a reduced pressure of 1 kg/cm$^2$. Upon flashing steam is generated at the rate of 1,000 kg/hr thereby cooling the solution to 101° C. The solution which has been regenerated in the auxiliary column 3, flows by line 27 at a temperature of 112° C through the pressure reducing valve 58, to the expansion vessel 5, where a steam flow of 3,100 kg/hr is generated, thereby cooling the solution to 101° C.

A supply of 6,000 kg/hr of motive steam is supplied by line 34 to the steam-jet thermocompressor 80, which recompresses the flashed vapour to the pressure of 1.54 kg/cm$^2$ which prevails at base of column 3, and discharges the mixture of motive steam and recompressed vapour at a flow rate of 10,100 kg/hr through line 35.

The combined flow of regenerated potassium carbonate solution, with a conversion of 41.5%, flows at a temperature of 101° C through line 28 to pump 82 and is recycled to absorber 1 through line 281.

No cooling is required in cooler 92. The lean DEA solution which leaves expansion vessel 4 at a temperature of 102° C flows through line 26 to pump 81, and is pumped to heat exchanger 100 where it preheats the spent scrubbing solution. From there it flows to cooler 91 where its temperature is adjusted to 45° C. The flow of desorbed $CO_2$ from the auxiliary column 3 is cooled in cooler 96 and leaves the regeneration unit at a pressure of 1.5 kg/cm$^2$ by line 39. The $CO_2$ which has been desorbed in the main column flows through line 32 to the heat exchanger 99 where it preheats the process condensate and then to cooler 93 before leaving the unit by line 37 at a pressure of 1.3 kg/cm$^2$.

The regeneration condensate which collects in the condensate drums 10 and 6 flows through line 29 at a combined flow rate of 9,600 kg/hr to pump 82, from where it is pumped to heat exchanger 99. This heat exchanger could equally well be heated by the overhead $CO_2$ and vapour stream from column 3. After preheating to 94° C, the condensate flows to kettle 95 at a rate of 7,200 kg/hr and the remainder is returned through valve 62 to the lower section of the main regeneration column as process reflux.

The total external heat requirement of the regeneration system is satisfied by the solution reboiler steam production of 4,800 kg/hr and the motive steam supply of 7,250 kg/hr to the thermocompressors 80 and 88. A total quantity of 9,040 Nm$^3$/hr of $CO_2$ has been removed from the process gas, and the specific heat consumption amounts to 825 kc/Nm$^3$ of $CO_2$ removed.

In this example, the two separate absorption zones 12 and 14 were combined in the same absorption column. It is obvious that the regeneration method according to the present invention applies equally well if the separate absorption zones are arranged in different columns.

It is to be noted that the flow diagrams of FIGS. 1 to 4 do not include all the necessary devices needed for the operation of an industrial plant. However, the additional devices needed for that purpose will be obvious for those skilled in the art.

It is also to be noted that the invention is not limited to the four above described embodiments and that the flow diagrams may be modified within the scope of this invention.

What I claim is:

1. A process for the regeneration of regenerable aqueous scrubbing solutions which are used for the bulk removal of acidic gases, by absorption from gas mixtures containing these acidic gases, in a cyclic process in which said aqueous scrubbing solutions are regenerated in a regeneration system by stream stripping before being recycled to the absorption stage, a part of the scrubbing solutions being regenerated in a main regeneration section of the regeneration system, whereas the other part of the scrubbing solutions is regenerated in an auxiliary regeneration section of the regeneration system, the process comprising the steps of selecting the pressure in the auxiliary regeneration section independently from the pressure in the main regeneration section and of obtaining at least a part of the stripping steam required in the auxiliary regeneration section through flashing of the scrubbing solution of which at least a part consists of the solution stream withdrawn from said auxiliary regeneration section in a reduced pressure zone connected to the suction side of a steam-jet thermocompressor, the mixture of thermocompressor motive steam and recompressed flashed vapour being directly discharged into said auxiliary regeneration section.

2. A process according to claim 1, in which all the stripping steam required in the auxiliary regeneration section is obtained by flashing of the scrubbing solution in at least one reduced pressure zone connected to the suction side of a steam-jet thermocompressor, the mixture of thermocompressor motive steam and recompressed flashed vapour being directly introduced into said auxiliary regeneration section.

3. A process according to claim 1, in which the pressure in the auxiliary regeneration section is lower than the pressure in the main regeneration section and a part of the stripping steam required in said auxiliary regeneration section is obtained by direct flashing of the scrubbing solution upon pressure reduction from the higher pressure of the main regeneration section to the lower pressure of the auxiliary regeneration section.

4. A process according to claim 3, in which the flashing to a reduced pressure, induced by the operation of a steam-jet ejector, is performed on a solution comprising at least one further stream of at least a partially regenerated scrubbing solution withdrawn from at least one further point of any one of the regeneration sections.

5. A process according to claim 1, in which the pressure in the auxiliary regeneration section is at least equal to the pressure in he main regeneration section.

6. A process according to claim 5, in which the flashing to a reduced pressure, induced by the operation of the steam-jet ejector is performed on a solution comprising at least one further stream of at least a partially regenerated scrubbing solution withdrawn from at least one further point of any of the regeneration sections.

7. A process according to claim 1, in which a part of the mixture of thermocompressor motive steam and recompressed flashed vapour is discharged in the main regeneration section.

8. A process according to claim 1, in which the spent scrubbing solution is separated in two fractions which are introduced respectively into the main regeneration section.

9. A process according to claim 1, in which all the spent scrubbing solution is introduced into the main regeneration section and a side steam of partially regenerated scrubbing solution is withdrawn from the main regeneration section and introduced into the auxiliary regeneration section, operating in parallel with said main regeneration section.

10. A process according to claim 1, in which two different scrubbing solution which have been used in separate gas absorption sections are regenerated in a single regeneration system comprising one main regenaration section and one auxiliary regeneration section, the stripping steam which has been used for the regeneration of one of the spent scrubbing solutions being reused as stripping steam for the regeneration of at least part of the other spent scrubbing solution.

11. A process according to claim 10, in which at least a part of the stripping steam used in the auxiliary section is obtained by flashing at least one stream of any one of the at least partially regenerated different scrubbing solutions, whereby each of said streams is withdrawn from one point of any one of the regeneration sections and flashed in one corresponding reduced pressure zone connected to the suction side of a corresponding steam-jet thermocompressor, and whereby each obtained mixture of thermocompressor motive steam and recompressed flashed vapour is discharged directly into said auxiliary section.

12. A process according to claim 10, in which at least a part of the stripping steam used in the auxiliary regeneration section is obtained by flashing at least one stream of any one of the at lest partially regenerated different scrubbing solutions, whereby each one of said streams is withdrawn from one point of any one of the regeneration sections and flashed in one corresponding reduced pressure zone connected to the suction side of a corresponding steam-jet thermocompressor, and whereby at least one obtained mixture of thermocompressor motive steam and recompressed flashed vapor is discharged, at least partially, into said auxiliary regeneration section, and any remaining mixture of thermocompressor motive steam and recompressed flashed vapour is discharged into the main regeneration section.

13. A process according to claim 1, wherein said acidic gas is selected from the group consisting of $CO_2$, $H_2S$, HCN, COS, $SO_2$ or a mercaptan.

14. A process according to claim 1, wherein said acidic gas is $CO_2$.

15. A process according to claim 1, wherein said regenerable aqueous scrubbing solution is a solution of a material selected from the group consisting of an alkaline carbonate, an alkanolamine, an alkali metal salt of an amino acid, an alkaline phosphate, an alkaline phenate, an alkaline borate, an alkali metal sulfate or an alkali metal bisulfate.

16. A process according to claim 15, wherein said material is potassium carbonate.

17. A process according to claim 15, wherein said material is diethanolamine.

* * * * *